United States Patent
James

(10) Patent No.: US 9,409,821 B2
(45) Date of Patent: Aug. 9, 2016

(54) COMPOSITIONS AND METHODS FOR WELL COMPLETIONS

(75) Inventor: Simon G. James, Le Plessis-Robinson (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 200 days.

(21) Appl. No.: 13/310,791

(22) Filed: Dec. 4, 2011

(65) Prior Publication Data

US 2012/0145392 A1 Jun. 14, 2012

(30) Foreign Application Priority Data

Dec. 8, 2010 (EP) ..................................... 10290646

(51) Int. Cl.
*C04B 28/04* (2006.01)
*C09K 8/46* (2006.01)
*C09K 8/467* (2006.01)

(52) U.S. Cl.
CPC . *C04B 28/04* (2013.01); *C09K 8/46* (2013.01); *C09K 8/467* (2013.01); *Y02W 30/96* (2015.05)

(58) Field of Classification Search
CPC .. E21B 33/146; E21B 2033/105; C09K 8/424
USPC ............... 166/293–295; 16/724, 802, 823; 507/219, 229, 231, 269; 523/130
See application file for complete search history.

(56) References Cited

U.S. PATENT DOCUMENTS 5,348,093 A 9/1994 Wood et al.
6,296,057 B2 * 10/2001 Thiercelin .................. 166/285

(Continued)

FOREIGN PATENT DOCUMENTS

EP 1129047 11/2002
WO 00/37387 6/2000

(Continued)

OTHER PUBLICATIONS

Pu-Woei Chen and D.D.L. Chung, "EFFECI—of Polymer Addition on the Thermal Stability and Thermal Expansion of Cement," Cement and Concrete Research, vol. 25, pp. 465-469, 1995.

(Continued)

*Primary Examiner* — Zakiya W Bates
*Assistant Examiner* — Ashish Varma
(74) *Attorney, Agent, or Firm* — Jeremy D. Tillman; Mike Flynn; Tim Curington

(57) ABSTRACT

Particulate polymeric materials may be added to a cement slurry to adjust the linear thermal-expansion coefficient of the set cement. The coefficient of the set cement is optimized by considering the linear thermal-expansion coefficient of the casing, as well as the mechanical properties of the formation rock. When placed in a subterranean well having at least one casing string, cement sheaths with optimal linear thermal-expansion coefficients may be subjected to lower compressive and tensile stresses during downhole-temperature changes. Such cement slurries are particularly advantageous in the context of thermal-recovery wells.

17 Claims, 4 Drawing Sheets

(56) References Cited

U.S. PATENT DOCUMENTS

| | | |
|---|---|---|
| 6,458,198 B1 | 10/2002 | Baret et al. |
| 6,645,289 B2 | 11/2003 | Sobolev et al. |
| 6,802,375 B2 | 10/2004 | Bosma et al. |
| 6,902,002 B1 | 6/2005 | Chatterji et al. |
| 7,913,757 B2 * | 3/2011 | Reddy et al. ............. 166/250.01 |
| 2003/0121662 A1 * | 7/2003 | Bosma et al. ................ 166/295 |
| 2004/0251026 A1 * | 12/2004 | Dargaud et al. ............... 166/292 |
| 2007/0062691 A1 * | 3/2007 | Reddy et al. ............. 166/250.01 |
| 2007/0151730 A1 | 7/2007 | Reddy et al. |
| 2009/0038855 A1 | 2/2009 | Ravi et al. |
| 2009/0095475 A1 | 4/2009 | Ravi et al. |
| 2010/0212892 A1 * | 8/2010 | Santra et al. ............. 166/250.14 |

FOREIGN PATENT DOCUMENTS

| | | |
|---|---|---|
| WO | 01/70646 | 9/2001 |
| WO | 2004/078671 | 9/2004 |
| WO | 2005/061846 | 7/2005 |

OTHER PUBLICATIONS

E.F. Irassar, A. Di Maio and O.R. Batic, "Sulfate Attack on Concrete With Mineral Admixtures," Cement and Concrete Composites, vol. 26, pp. 113-123, 1996.

Cengiz Duran Atis, Alaettin Kilic, Umur Korkut Sevim, "Strength and shrinkage properties of mortar containing a nonstandard high-calcium fly ash," Cement and Concrete Composites, vol. 34, pp. 99-102, 2004.

K.S. Rebeiz, D.W. Fowler, D.R. Paul, "Polymer concrete and polymer mortar using resins based on recycled poly (ethylene terephthalate)," J. Appl. Polymer Sci. vol. 44, pp. 1649-1655 (1992).

Thiercelin MJ et al. "Cement Design Based on Cement Mechanical Response," paper SPE 38598 (1997).

Dargaud B and Boukelifa L: "Laboratory Testing, Evaluation, and Analysis of Well Cements," in Nelson EB and Guillot D (eds.): Well Cementing (2nd Edition) Schlumberger, Houston, USA (2006) 627-658.

\* cited by examiner

COMPOSITIONS AND METHODS FOR WELL COMPLETIONS

CROSS-REFERENCE TO RELATED APPLICATION

The current application is based on and claims the benefit of priority from European Patent Application No. 10290646.8, filed on Dec. 8, 2010; the entire contents of which are hereby incorporated by reference.

BACKGROUND

The statements in this section merely provide background information related to the present disclosure and may not constitute prior art.

This disclosure relates to compositions and methods for treating subterranean formations, in particular, compositions and methods for cementing and completing thermal recovery wells.

During the construction of subterranean wells, it is common, during and after drilling, to place a tubular body in the wellbore. The tubular body may comprise drill pipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone.

The cement sheath achieves hydraulic isolation because of its low permeability. In addition, intimate bonding between the cement sheath and both the tubular body and borehole is necessary to prevent leaks. However, over time the cement sheath can deteriorate and become permeable. Alternatively, the bonding between the cement sheath and the tubular body or borehole may become compromised. The principal causes of deterioration and debonding include physical stresses associated with tectonic movements, temperature changes and chemical deterioration of the cement.

When oil and gas wells are subjected to temperature changes (e.g., during steam injection or the production of hot reservoir fluids), the casing expands and induces stresses in the cement sheath. Development of heavy oil reserves often involves applying heat to the producing reservoir. Such thermal-recovery wells frequently employ steam injection. Steam injection encompasses a number of techniques, including steam assisted gravity drainage (SAGD), cyclic steam stimulation (CSS) and steamflooding. During such operations, the resulting well temperature may vary from 150° to 350° C., subjecting the cement sheath to especially severe stresses and possibly leading to cement-sheath failure, formation of microannuli or both. Indeed, a significant percentage of thermal-recovery wells suffer from various forms of leaks including complete steam breakthrough to surface.

There have been several proposals to solve the problems of cement-sheath deterioration. One approach is to design the cement sheath to mechanically survive physical stresses that may be encountered during its lifetime (U.S. Pat. No. 6,296, 057). Another approach is to employ additives that improve the physical properties of the set cement. U.S. Pat. No. 6,458, 198 describes the addition of amorphous metal fibers to improve the strength and impact resistance. EP 1129047 and WO 00/37387 describe the addition of flexible materials (rubber or polymers) to confer a degree of flexibility to the cement sheath. WO 01/70646 describes cement compositions that are formulated to be less sensitive to temperature fluctuations during the setting process. However, these solutions are not as effective in the context of thermal-recovery wells. The stresses may be too severe for the solutions to be effective, the active material may not be stable at such high temperatures, or both.

Therefore, despite the valuable contributions of the prior art, improved cement formulations that can better withstand the thermal and mechanical stresses associated with thermal-recovery wells would be advantageous.

SUMMARY

Embodiments allow improvements by providing cement formulations whose thermal-expansion properties may be optimized for a particular well environment. Optimal cement-sheath expansion and contraction during well-temperature fluctuations minimizes stresses on the cement sheath and the cement/casing bond, thereby helping to preserve zonal isolation in the well.

In an aspect, embodiments relate to methods for adjusting the thermal-expansion properties of a cement sheath placed in a subterranean well, the methods comprising: incorporating at least one particulate polymeric material in a cement slurry that once placed in the subterranean well sets to form said cement sheath; the polymeric material having a thermal-expansion coefficient is higher than that of the base cement.

In a further aspect, embodiments relate to methods for cementing a subterranean well comprising: providing a cement slurry comprising water and a base cement, the base cement having a linear thermal-expansion coefficient after setting; adding at least one particulate polymeric material to the cement slurry, the material having a higher thermal-expansion coefficient than that of the set base cement; and placing the cement slurry comprising water, base cement and particulate polymeric material into the well.

In yet a further aspect, embodiments relate to methods of using polymeric particulate materials to adjust the thermal-expansion properties of a cement sheath placed in a subterranean well.

DETAILED DESCRIPTION

Figure 1:
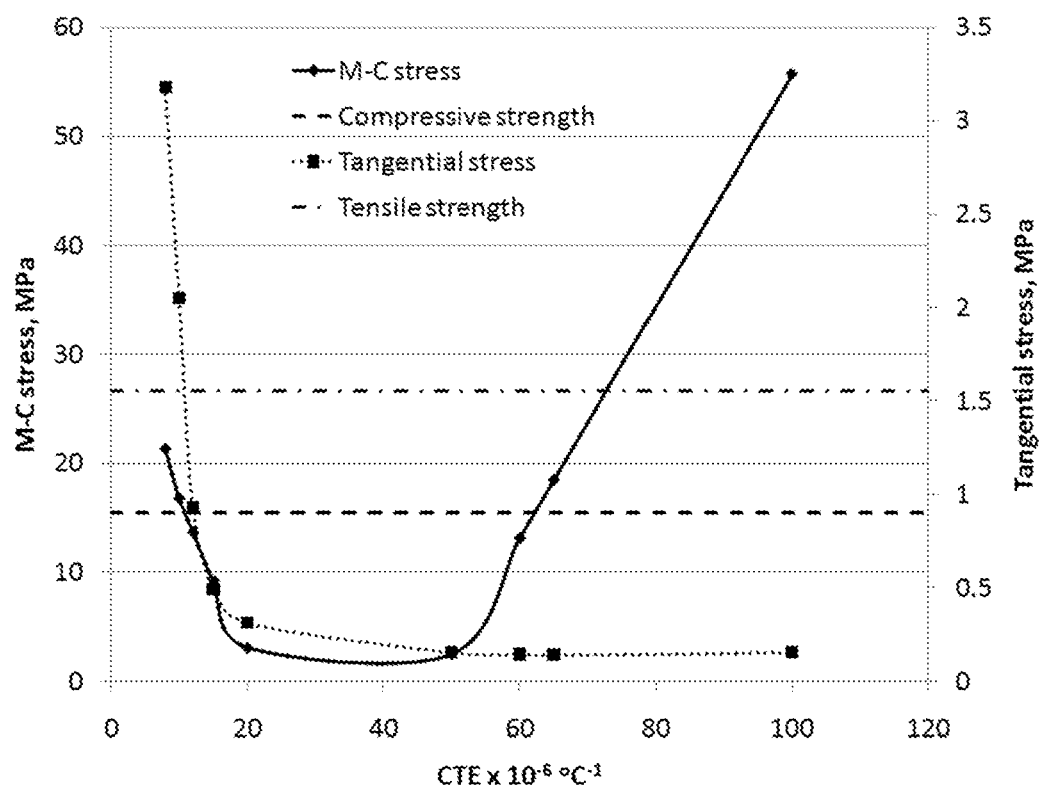
FIG. 1 is a graph that shows how the Mohr-Coulomb stress and tangential stress vary with the cement linear thermal-expansion coefficient (hereinafter abbreviated as "LCTE").

The disclosure relates to treatment of vertical wells, but is equally applicable to wells of any orientation. Hydrocarbon production wells are described, but it is to be understood that the disclosure may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Most materials expand when they are heated because, as the temperature increases, the distance between the atoms also increases. Thermal expansion may be expressed in various ways. The linear coefficient of thermal expansion (LCTE) describes the specific linear elongation of a material per unit value of temperature and at a constant pressure. The areal coefficient of thermal expansion (ACTE) relates the change in a material's area dimensions as a function of temperature. The volumetric coefficient of thermal expansion (VCTE) describes the change in volume of a material per unit value of temperature. For exactly isotropic materials, the VCTE is three times the LCTE.

A typical LCTE for a conventional set Portland cement is about $8 \cdot 10^{-6}/°$ C., whereas the typical LCTE for carbon steel is about $13 \cdot 10^{-6}/°$ C. Thus, when a cement sheath around casing is subjected to a thermal load, the dimensions of the casing will change more than those of a conventional Portland-cement sheath. In the presence of thermal loads associated with thermal-recovery wells, the dimensional divergence may induce significant mechanical stresses on the cement sheath, leading to cement-sheath failure in either tensile or compressive modes, or both. The present disclosure minimizes the aforementioned stresses by providing set cements whose LCTEs are more compatible with the casing LCTE.

The mechanical properties of the cement sheath and the formation rock may also figure prominently in determining the downhole-stress environment as the well temperature increases. Adjusting the cement-sheath LCTE may moderate the impact of the mechanical properties, helping to preserve zonal isolation.

The inventor has determined that the thermal-expansion properties of a cement system may be adjusted by adding certain polymeric particles to the cement composition. The particles have higher LCTEs than the set base cement. Skilled persons in the art will recognize that the base cement is the principal cementitious material without additives. Preferred base cements include (but are not limited to) Portland cement, calcium aluminate cement, lime-silica blends, geopolymers, Sorel cements, chemically bonded phosphate ceramics and cement-kiln dust. Of these, Portland cement is preferred.

In an aspect, embodiments relate to methods for adjusting the thermal-expansion properties of a cement system for placement in a subterranean well having at least one casing string. The method comprises incorporating a polymeric material in the cement system, such that the LCTE of the set cement is higher than that of set base cement that does not contain the polymeric material.

A modeling application, such as CemSTRESS™ cement sheath stress analysis software, available from Schlumberger, can be employed to analyze the well completion and the proposed well-production strategy, and aid cement-slurry design. The physics of the model is described in the following publication: Thiercelin M J et al.: "Cement Design Based on Cement Mechanical Response," paper SPE 38598 (1997). The software then determines the optimal mechanical properties and the necessary amount of cement-sheath expansion. Ultimately, a cement system is designed that meets the requirements specified by the software.

In this configuration, one determines the mechanical properties of the formations surrounding the wellbore. Knowledge of the Young's moduli is required; however, it is preferable to also know the Poisson's ratios, and even more preferable to additionally know both the compressive strengths and tensile strengths. Next, one selects a candidate cement system with a known amount of thermal expansion after setting. Well-geometry and casing-geometry data are also acquired. Such data are usually available from the well operator. Then, the stress-analysis software is preferably employed to estimate the downhole pressure, temperature and in-situ stresses that result from the application of heat, pressure or both in the well. The software also preferably evaluates how the stresses resulting from the application of heat, pressure or both affect cement-sheath integrity, the cement/casing bond and the cement/formation bond.

If cement-sheath failure is indicated, which may be manifested in the form of radial or longitudinal cracking during the application of heat, pressure or both, one modifies the candidate cement system to feature an additional amount of thermal expansion after setting. Such modification comprises the addition of at least one particulate polymeric material to the cement slurry. The software is again employed to determine the stresses' effects on the cement-sheath integrity and bonding. This iterative process is continued until the model predicts that the cement sheath will remain intact during the application of heat, pressure or both.

After a cement design has been determined that can withstand the stresses associated with the application of heat, pressure or both, attention is paid to the cement/casing and cement/formation bonds. If the model predicts the presence of a microannulus at either interface during the application of heat, pressure or both, the candidate system is modified to have a lower amount of expansion. This may be accomplished by varying the types of particulate polymeric particles, the particulate-polymeric-particle concentrations, or both. The software then reevaluates the effects of applying heat, pressure or both. This iterative process is again continued until the model predicts that cement-sheath failure will not occur during the application of heat, pressure or both. Once success is achieved, the modified cement system is selected as the "final design" for application in the well.

In a further aspect, embodiments relate to method for cementing a subterranean well having at least one casing string. A cement slurry is provided that comprises water and a base cement, the base cement having an LCTE after setting. At least one particulate polymeric material, with an LCTE higher than that of the set base cement, is added to the cement slurry. The cement slurry is pumpable and comprises water, base cement and at least one particulate polymeric material. The slurry is placed in the well adjacent to the casing string and then allowed to set. Those skilled in the art will recognize that a pumpable cement slurry has a viscosity preferably below about 1000 mPa-s at a shear rate of $100\ s^{-1}$, throughout the temperature range the slurry will experience during placement in the well. The resulting cement sheath has a LCTE that is higher than that of set base cement that does not contain the polymeric material.

In yet a further aspect, embodiments relate to the use of one or more particulate polymeric materials to adjust the thermal-expansion properties of a cement sheath placed in a subterranean well having at least one casing string. The cement sheath comprises water, a base cement and at least one particulate polymeric material. The cement sheath preferably has a LCTE that is higher than the set-base-cement LCTE that does not contain the polymeric material.

For all embodiments, the particulate-polymeric-material LCTE is preferably between about $20 \cdot 10^{-6}/°$ C. and about $200 \cdot 10^{-6}/°$ C. A more preferred linear thermal-expansion-coefficient range is between about $50 \cdot 10^{-6}/°$ C. and $170 \cdot 10^{-6}/°$ C., and an even more preferred linear thermal-expansion coefficient range is between about $70 \cdot 10^{-6}/°$ C. and $130 \cdot 10^{-6}/°$ C.

Without wishing to be bound by any theory, the polymeric particles should have sufficient bulk modulus to deform the set cement, but should not be too high; otherwise, the set cement may fail. Generally, the allowable bulk modulus may increase as the polymer-particle size decreases. Therefore, for all embodiments, the bulk modulus of the particulate-polymeric material is preferably less than about between 1000 MPa and 8200 MPa, and more preferably between 2000 MPa and 6500 MPa.

Suitable polymeric materials may include (but are not limited to) isotactic polypropylenes, polystyrenes, polyamides, cis-polyisoprenes, polyvinylchlorides (PVC), polytetrafluoroethylenes (PTFE), polyacryetherketones (e.g., PEEK) polyethylenes (e.g., HDPE), polyviylidene fluorides (PVDF), polyethylene terephthalates (PET), styrene-isoprene-styrene, styrene-ethylene/butylene-styrene, styrene-ethylene/propylene-styrene and styrene-butadiene-styrene block copolymers, and rubbers such as (but not limited to) acrylonitrile-butadiene, hydrogenated acrylonitrile-butadiene, styrene-butadiene, ethylene-propylene diene monomer (EPDM), fluoroelastomers (FKM) and perfluoro elastomers (FFKM). Bulk moduli and LCTEs of some suitable polymeric materials are presented in Table 1.

TABLE 1

Bulk Moduli and LCTEs of Polymeric Materials.

| Polymer | Bulk Modulus (MPa) | LCTE · $10^{-6}/°$ C. |
|---|---|---|
| Isotactic polypropylene | 2100 | 90 |
| Polystyrene | 3000 | 60 |
| Polyamide 6,10 | 2300 | 80 |
| Polyamide 6,6 | 6000 | 70 |
| Cis-polyisoprene | 2000 | 66 |
| PVC | 1900 | 52 |
| PTFE | 2100 | 124 |
| PEEK | 6300 | 160 |
| HDPE | 3300 | 110 |
| PVDF | 2100 | 120 |
| PET | 3800 | 90 |
| Rubber | — | 77 |
| Polyethersulphone | 4200 | 55 |
| Polyetherimide | 8100 | 56 |
| Polybenzimidazole | 3300-4500 | 23 |
| Polyphenylsulphone | 3100 | 55 |

Without wishing to be bound by any theory, the size of the polymeric particles should preferably not be too small; otherwise, the particle may expand into cement-matrix pores, diminishing the particles' effect on the cement-sheath LCTE.

In addition, without wishing to be bound by any theory, the size of the polymeric particles should preferably not be too large; otherwise, the particle expansion may generate high local stresses in the cement sheath possibly leading to failure. Therefore, for all embodiments, the average particle size ($d_{50}$) of the particulate polymeric material is preferably between about 1 μm and 1 mm, more preferably between about 10 μm and 750 μm, and most preferably between about 100 μm and 500 μm.

For all embodiments, the preferred particulate-polymeric-material concentration is preferably between about 1% and about 30% by volume of set cement, more preferably between about 4% and about 20% by volume of set cement and most preferably between 5% and 15% by volume of set cement. Within these ranges, the appropriate polymer-particle concentration varies from polymer to polymer.

The well may be a thermal-recovery well. If the cement slurry comprises Portland cement, silica may be added to prevent strength retrogression at the high temperatures associated with thermal-recovery wells. Depending on the ultimate temperature, the silica concentration may be adjusted such that the calcium oxide-to-silicon dioxide ($CaO/SiO_2$) ratio is between about 0.6 and 1.2. Such compositions may promote the formation of beneficial calcium-silicate-hydrate minerals such as xonotlite and truscottite. Under these circumstances, the silica concentration in the cement slurry may be between about 20% and 60% by weight of cement, and preferably between about 35% and 45% by weight of cement. The particle size of the silica may vary from 0.1 μm to 200 μm, preferably from 5 μm to 100 μm. In addition, the particulate polymeric material should preferably not melt when exposed to the elevated well temperatures.

For all embodiments, the cement slurry may further comprise one or more members of the list comprising accelerators, retarders, dispersants, fluid-loss additives, extenders, swellable materials, chemical expansion agents, pozzolans, fibers, gas-generating agents and antifoam agents. The cement-slurry density may be adjusted by adding extenders or weighting agents, which include (but are not limited to) glass microspheres, ceramic microspheres, gilsonite, hematite, ilmenite, barite and manganese tetraoxide. The particulate polymeric material should preferably be compatible with not only the base cement (and its associated pH environment) but also the additives listed above. The density of the cement slurry involved in the various embodiments as described above is preferably from 900 kg/m$^3$ to 2300 kg/m$^3$, more preferably from 1200 kg/m$^3$ to 2000 kg/m$^3$ and even more preferably from 1500 kg/m$^3$ to 1900 kg/m$^3$.

EXAMPLES

The following examples are not limiting and serve to further illustrate the disclosure.

Example 1

In steam injection wells, the principal failure mechanisms of the cement sheath are usually tensile failure and compressive failure. With conventional cement systems, with a LCTE lower than that of the casing, these failures are typically due to the casing expanding more than the cement sheath when the temperature in the well rises. The following example illustrates how the cement-sheath CTE affects cement-sheath failure in a cased wellbore. CemSTRESS™ cement sheath stress analysis software, available from Schlumberger, was employed to analyze the effect. The physics of the model is described in the following publication: Thiercelin M J et al.:

"Cement Design Based on Cement Mechanical Response," paper SPE 38598 (1997). The software is usually employed to determine the optimal mechanical properties of the cement sheath for a given set of well conditions. A cement system is then designed to meet the requirements specified by the software. The model parameters include the well geometry, casing size/type, formation mechanical properties (LCTE, compressive strength, Young's modulus and Poisson's ratio) and the cement-sheath mechanical properties (LCTE, compressive strength, Young's modulus and Poisson's ratio). In addition to being used as a cement-slurry design tool, CemSTRESS™ may also be employed to investigate how well integrity is affected by varying these parameters.

The well, rock and cement parameters for this example are presented in Table 2.

TABLE 2

Well, Rock and Cement Parameters for Wellbore Simulation.

| Rock: | | | |
|---|---|---|---|
| Open hole | 21.6 cm (8.5 in.) | Poisson's ratio | 0.3 |
| Casing | 17.8 cm (7 in.), 38.7 kg/m | CTE | $13 \cdot 10^{-6}/°$ C. |
| Standoff | 100% | | |
| | | Cement: | |
| | | Poisson's ratio | 0.15 |
| Temperature Ramp | 20° to 260° C. in 4 hours | | |

In a first simulation, the effect of varying the LCTE on the tangential and Mohr-Coulomb (M-C) stresses and consequent cement-sheath failure or survival was examined. The rock Young's modulus was 5200 MPa and the cement Young's modulus was 4000 MPa. The tensile strength of the cement was 1.6 MPa and the compressive strength was 15.5 MPa. All other simulation parameters are the same as in Table 2. The results are plotted in FIG. 1. Increasing the LCTE of the cement system decreases both the Mohr-Coulomb stress and the tangential stress on the cement system. When the LCTE is $12 \cdot 10^{-6}/°$ C. and higher the cement sheath no longer fails in tension—the tangential stress is always lower than the tensile strength of the cement. When the LCTE reaches $12 \cdot 10^{-6}/°$ C. the cement no longer fails in compression (the Mohr-Coulomb stress is less than the compressive strength of the cement). However, when the LCTE exceeds $60 \cdot 10^{-6}/°$ C., the simulation indicates that the cement starts to fail in compression due to excessive stresses generated. Therefore, for this example, there is a LCTE range (from $12 \cdot 10^{-6}/°$ C. to $60 \cdot 10^{-6}/°$ C.) within which the cement sheath does not fail. In these simulations, with the cement Young's modulus lower than the rock Young's modulus, there was no formation of a microannulus.

However, in some cases the cement Young's modulus may be higher than the rock Young's modulus, in which case there may be a risk of generating a microannulus. During heating, the cement sheath with a higher LCTE than the casing may expand away from the casing, leading to the formation of a microannulus. Simulations were performed to determine the conditions under which this might occur. Two cement Young's moduli were considered: 8500 MPa and 4500 MPa.

Figure 2:
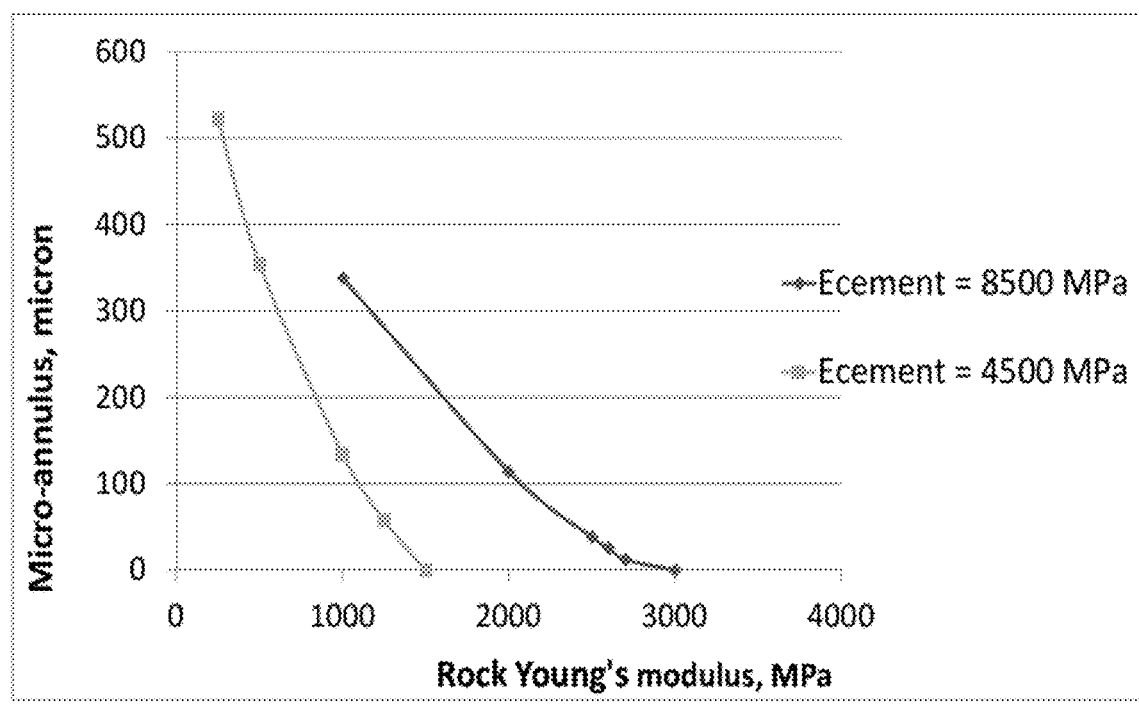
FIG. 2 presents a graph that shows how the size of a cement/casing microannulus varies with the Young's modulus of the formation rock. This case assumes the LCTE to be $50 \cdot 10^{-6}/°$ C.

During one simulation, the LCTE of the cement sheath was assumed to be $50 \cdot 10^{-6}/°$ C. The model analyzed the degree of cement-sheath failure (as evidenced by the size of a microannulus between the cement sheath and the casing) as a function of rock Young's modulus. The results, plotted in FIG. 2, indicate that no microannulus will appear as long as the rock Young's modulus is higher than about 33% of the cement Young's modulus.

Figure 3:
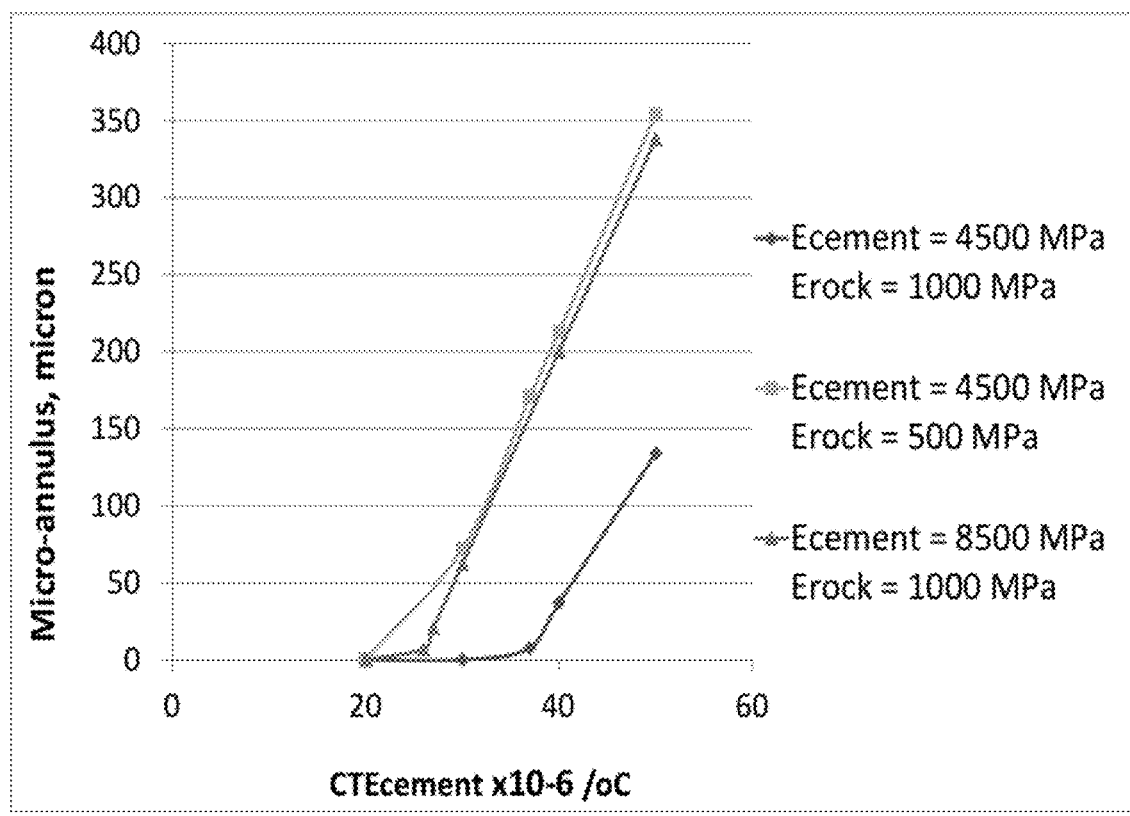
FIG. 3 presents a graph that shows how the size of a cement/casing microannulus varies with the cement LCTE. Various ratios of formation-rock and cement Young's moduli are considered.

During another simulation, the Young's moduli of both the rock and the cement were varied. The model determined the effect of cement-sheath LCTE on the microannulus size. The results plotted in FIG. 3 show that, for a well with the formation-rock properties presented in Table 2, a cement-sheath LCTE lower than about $20 \cdot 10^{-6}/°$ C. should be acceptable. These results also indicate why no microannulus was observed in the first simulation, even with LCTE values, as the cement Young's modulus was lower than the rock Young's modulus in Simulation 1.

Example 2

The influence of various polymeric materials on set-cement thermal-expansion properties was investigated. The cement-slurry compositions are given in Table 3. The material concentrations are expressed by volume of cement-blend solids, commonly expressed as a percentage by volume of blend (BVOB). The solid volume fraction of the slurries was 57%. The slurry densities varied from 1550 kg/m$^3$ to 2050 kg/m$^3$, depending on the concentration and type of particle used.

TABLE 3

Cement Compositions for Measurement of Thermal-Expansion Coefficient

| Material | Concentration (% BVOB) |
|---|---|
| Cement - Class G | 35 |
| Fine silica (>90%-<10 microns) | 15 |
| Large silica (100-700 microns) | 0, 20, 30 or 50* |
| Polymer particle (100-800 microns) | 50, 30, 20 or 0* |

*Sum of large-silica and polymer-particle concentrations = 50% BVOB)

The sum of the large-silica and polymer-particle concentrations was 50% BVOB. The particle-size range of the silica and polymers is given in Table 3. The cement slurries also contained silicone antifoam agent (2 L/tonne of blend), polynaphthalene-sulfonate dispersant (4 L/tonne of blend), welan-gum antisettling agent (0.02% by weight of blend) to ensure slurry stability and homogeneity and a synthetic polymer-base fluid-loss additive (0.2% by weight of blend). Three polymer particles were tested: high-density polyethylene (HDPE, Icoflo HD20 from ICO Polymers), polypropylene (PP, Icorene 9013P from ICO Polymers) and acrylonitrile-butadiene rubber (ABR, Chemigum P86F from Eliokem).

Cement slurries were prepared and cured according to the standard methods given in the following publication: "Petroleum and Natural Gas Industries—Cements and Materials for Well Cementing—Part 2: Testing of Well Cements," International Organization for Standards Publication No. 10426-2. After preparation, the cement slurries were poured into molds with the following dimensions: 30 mm×30 mm×120 mm. The molds were then placed in a pressurized curing chamber for two days in at 20.7 MPa and 30° C. temperature. The samples were then removed and placed in a water bath at 30° C. for an additional 16 to 19 days to ensure stable cement properties.

The CTEs of the cement systems were then measured by the mechanical-dilatometry technique. The technique and apparatus are described in the following publication: Dargaud B and Boukelifa L: "Laboratory Testing, Evaluation, and Analysis of Well Cements," in Nelson E B and Guillot D (eds.): *Well Cementing* (2$^{nd}$ Edition) Schlumberger, Houston, USA (2006) 627-658. The set-cement-sample temperature was increased from about 20° to about 70° C., in 10° C. increments. The heating rate was 10° C./hour After each increment, cement-sample temperature was maintained for one hour to establish equilibrium. The samples were then cooled from 70° C. to 20° C. at a rate of 6.25° C. per hour.

Figure 4:
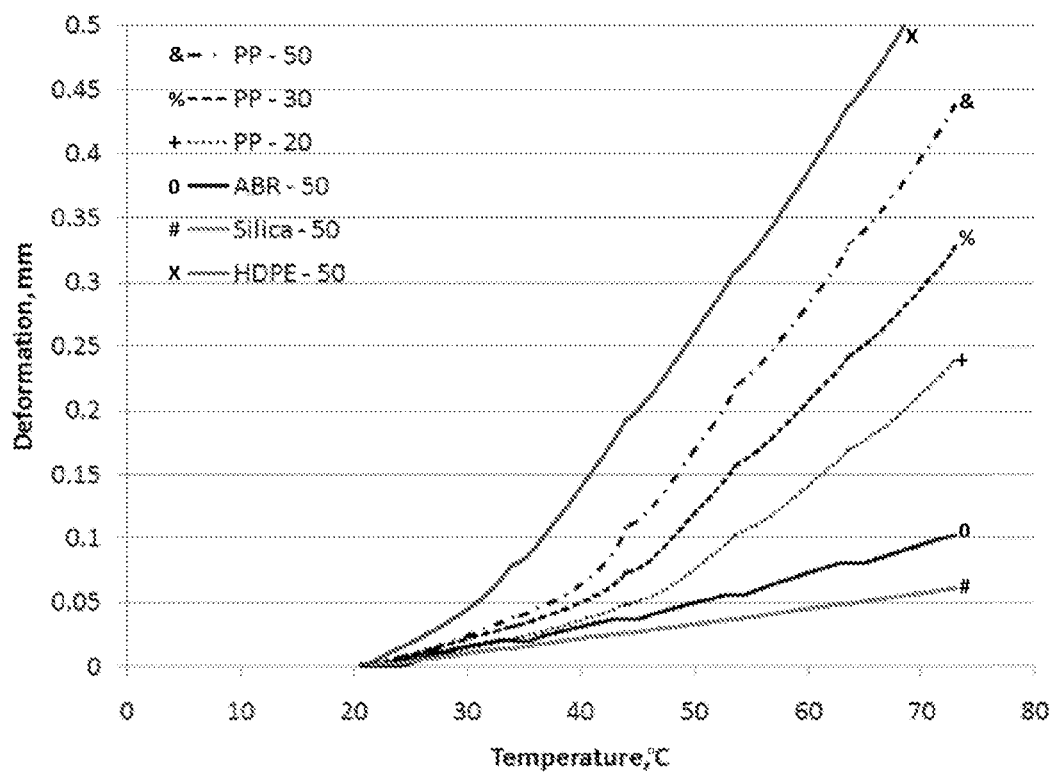
FIG. 4 is a graph showing linear deformation of cement systems containing various polymer particles versus temperature.

The plot presented in FIG. 4 shows the deformation of the 120-mm bars as a function of temperature. The legend indicates the particle type and concentration. For example, PP-20 is a slurry containing polypropylene particles at a concentration of 20% BVOB and, in keeping with the coarse silica+ polymer concentration being held constant at 50% BVOB, the PP-20 slurry contained 30% coarse silica. The results show that the CTE may be adjusted by varying the polymer-particle type and the polymer-particle concentration. For example, FIG. 4 shows that the polypropylene (PP) particles provide more thermal expansion than the acrylonitrile-butadiene-rubber (ABR) particle. In addition, the high-density-polyethylene (HDPE) particle provided more thermal expansion than the polypropylene particle at the same concentration. This is consistent with the higher LCTE of HDPE relative to PP. The CTEs of the cement systems shown in FIG. 4 are presented in Table 4.

TABLE 4

LCTEs of Exemplary Cement Systems.

| | PP-50 | PP-30 | PP-20 | ABR-50 | HDPE-50 | Silica-50 |
|---|---|---|---|---|---|---|
| CTE × $10^{-6}$ °C.$^{-1}$ | 88.7 | 66.6 | 49.0 | 18.0 | 106 | 11 |

The invention claimed is:

1. A method for adjusting the linear coefficient of thermal expansion of a cement sheath placed in a subterranean well having a wellbore, comprising:
   (i) determining mechanical properties of formations surrounding the wellbore, wherein the mechanical properties comprise Young's modulus and Poisson's ratio;
   (ii) acquiring well geometry and casing geometry data;
   (iii) selecting a candidate cement system comprising water and a base cement, the cement system having a known linear coefficient of thermal expansion after setting;
   (iv) employing stress analysis software that estimates downhole pressure, temperature and in-situ stresses, and calculates cement sheath integrity, cement/casing bonding and cement/formation bonding;
   (v) if cement sheath failure is indicated, modifying the candidate cement system by adding at least one particulate polymeric material having a thermal expansion coefficient that is higher than that of the candidate cement system; and
   (vi) repeating steps iv and v until cement sheath failure is not indicated, thereby determining a final design;
   wherein the polymeric particulate material comprises one or more members selected from the group consisting of isotactic polypropylenes, polystyrenes, cis-polyisoprenes, polyvinylchlorides, polytetrafluoroethylenes, polyaryletherketones, polyethylenes, polyvinylidene fluorides, polyethylene terephthalates, styrene-isoprene-styrene, styrene-ethylene/butyl ene-styrene, styrene-ethylene/propylene-styrene and styrene-butadiene-styrene block copolymers, acrylonitrile-butadiene, hydrogenated acrylonitrile-butadiene, styrene-butadiene, ethylene-propylene diene monomer (EPDM), fluoroelastomers (FKM) and perfluoro elastomers (FFKM), wherein the linear coefficient of thermal expansion of the cement sheath is between 18.0·$10^{-6}$° C.$^{-1}$ and 106·$10^{-6}$ C.$^{-1}$.

2. The method of claim 1, wherein the linear thermal-expansion coefficient of the polymeric particulate material is between about 20·$10^{-6}$/° C. and about 200·$10^{-6}$/° C.

3. The method of claim 1, wherein the average particle size of the polymeric particulate material is between about 1 μm and 1 mm.

4. The method of claim 1, wherein the bulk modulus of the polymeric particulate material is below about 8000 MPa.

5. The method of claim 1, wherein the polymeric particulate-material concentration is between about 1% and about 30% by volume of set cement.

6. A method for cementing a subterranean well having a wellbore, comprising:
   (i) determining mechanical properties of formations surrounding the wellbore, wherein the mechanical properties comprise Young's modulus and Poisson's ratio;
   (ii) acquiring well geometry and casing geometry data;
   (iii) selecting a candidate cement system comprising water and a base cement, the cement system having a known linear thermal-expansion coefficient after setting;
   (iv) employing stress analysis software that estimates downhole pressure, temperature and in-situ stresses, and calculates cement sheath integrity, cement/casing bonding and cement/formation bonding;
   (v) if cement sheath failure is indicated, modifying the candidate cement system by adding at least one particulate polymeric material having a thermal expansion coefficient that is higher than that of the candidate cement system;
   (vi) repeating steps iv and v until cement sheath failure is not indicated, thereby determining a final design; and
   (vii) placing the final design into the well,
   wherein the polymeric particulate material comprises one or more members selected from the group consisting of isotactic polypropylenes, polystyrenes, cis-polyisoprenes, polyvinylchlorides, polytetrafluoroethylenes, polyaryletherketones, polyethylenes, polyvinylidene fluorides, polyethylene terephthalates, styrene-isoprene-styrene, styrene-ethylene/butyl ene-styrene, styrene-ethylene/propylene-styrene and styrene-butadiene-styrene block copolymers, acrylonitrile-butadiene, hydrogenated acrylonitrile-butadiene, styrene-butadiene, ethylene-propylene diene monomer (EPDM), fluoroelastomers (FKM) and perfluoro elastomers (FFKM),
   wherein the linear coefficient of thermal expansion of the cement sheath is between 18.0·$10^{-6}$° C.$^{-1}$ and 106·$10^{-6}$ C.$^{-1}$.

7. The method of claim 6, wherein the linear thermal-expansion coefficient of the polymeric particulate material is between about 20·$10^{-6}$/° C. and about 200·$10^{-6}$/° C.

8. The method of claim 6, wherein the average particle size of the polymeric particulate material is between about 1 μm and 1 mm.

9. The method of claim 6, wherein the bulk modulus of the polymeric particulate material is below about 8000 MPa.

10. The method of claim 6, wherein the polymeric particulate-material concentration is between about 1% and about 30% by volume of set cement.

11. A method of using at least one particulate polymeric materials to adjust the linear coefficient of thermal expansion of a cement sheath in a subterranean well having a wellbore, comprising:

(i) determining mechanical properties of formations surrounding the wellbore, wherein the mechanical properties comprise Young's modulus and Poisson's ratio;

(ii) acquiring well geometry and casing geometry data;

(iii) selecting a candidate cement system comprising water and a base cement, the cement system having a known linear thermal-expansion coefficient after setting;

(iv) employing stress analysis software that estimates downhole pressure, temperature and in-situ stresses, and calculates cement sheath integrity, cement/casing bonding and cement/formation bonding;

(v) if cement sheath failure is indicated, modifying the candidate cement system by adding the at least one particulate polymeric material having a thermal expansion coefficient that is higher than that of the candidate cement system; and (vi) repeating steps iv and v until cement sheath failure is not indicated, thereby determining a final design;

wherein the polymeric particulate material comprises one or more members selected from the group consisting of isotactic polypropylenes, polystyrenes, cis-polyisoprenes, polyvinylchlorides, polytetrafluoroethylenes, polyaryletherketones, polyethylenes, polyvinylidene fluorides, polyethylene terephthalates, styrene-isoprene-styrene, styrene-ethylene/butyl ene-styrene, styrene-ethylene/propylene-styrene and styrene-butadiene-styrene block copolymers, acrylonitrile-butadiene, hydrogenated acrylonitrile-butadiene, styrene-butadiene, ethylene-propylene diene monomer (EPDM), fluoroelastomers (FKM) and perfluoro elastomers (FFKM), wherein the linear coefficient of thermal expansion of the cement sheath is between $18.0 \cdot 10^{-6 \circ}$ $C.^{-1}$ and $106 \cdot 10^{-6 \circ}$ $C.^{-1}$.

12. The method of claim 11, wherein the linear thermal-expansion coefficient of the polymeric particulate material is between about $20 \cdot 10^{-6}/^\circ$ C. and about $200 \cdot 10^{-6}/^\circ$ C.

13. The method of claim 12, wherein the linear thermal-expansion coefficient of the particulate polymeric material is between about $70 \cdot 10^{-6}/^\circ$ C. and about $130 \cdot 10^{-6}/^\circ$ C.

14. The method of claim 11, wherein the average particle size of the polymeric particulate material is between about 1 μm and 1 mm.

15. The method of claim 14, wherein the average particle size of the polymeric particulate material is between about 100 μm and 500 μm.

16. The method of claim 11, wherein the bulk modulus of the polymeric particulate material is below about 8000 MPa.

17. The method of claim 11, wherein the polymeric particulate-material concentration is between about 1% and about 30% by volume of set cement.

\* \* \* \* \*